United States Patent [19]
Mannix

[11] 3,835,281
[45] Sept. 10, 1974

[54] DIFFERENTIAL MICROWAVE HEATING CONTAINER

[76] Inventor: Frank L. Mannix, 20 Beechcraft Rd., Newton, Mass.

[22] Filed: July 5, 1973

[21] Appl. No.: 376,677

[52] U.S. Cl............ 219/10.55, 99/430, 206/4, 220/22, 220/40 R
[51] Int. Cl....... H05b 9/06, B65d 1/24, A45c 11/20
[58] Field of Search........... 219/10.55; 99/403, 430, 99/433; 206/4; 220/20, 40 R, 23.8, 44 R

[56] References Cited
UNITED STATES PATENTS

| | | | |
|---|---|---|---|
| 2,641,912 | 6/1953 | Lawler | 220/23.8 |
| 2,731,996 | 1/1956 | Hayes | 220/20 X |
| 3,107,027 | 10/1963 | Hong | 220/23.8 |
| 3,219,460 | 11/1965 | Brown | 219/10.55 |
| 3,708,086 | 1/1973 | Colato | 206/40 X |

Primary Examiner—J. V. Truhe
Assistant Examiner—Hugh D. Jaeger
Attorney, Agent, or Firm—Stein and Orman

[57] ABSTRACT

A differential heating container for cooking food contained therein with microwave radiation comprising an upper and lower container element each including a plurality of ribs which form a plurality of corresponding pockets such that when the container elements are placed together, the corresponding pockets cooperatively form individual food compartments isolated from one another. Opposite sides of each compartment include equal amounts of microwave opaque area which determine the heating effects of the microwave radiation for each individual compartment independent of the remaining compartment. Locking means are formed on the ribs to cooperatively interlock the upper and lower container elements together as an integral differential heating container.

8 Claims, 5 Drawing Figures

PATENTED SEP 10 1974　　　　　3,835,281

DIFFERENTIAL MICROWAVE HEATING CONTAINER

BACKGROUND OF THE INVENTION

1. Field of the Invention

The present invention relates to a differential heating container comprising a pair of interlocking container elements forming a plurality of food compartments. Opposite sides of the container element corresponding to each food compartment include equal amounts of microwave opaque area which determine the heating effects of the microwave radiation for each individual compartment.

2. Description of the Prior Art

Recently numerous devices have been developed to provide a quick means of cooking various food products. A particular active area is the field of prepackaged food stuffs where an entire meal is prepackaged in a single container.

Perhaps the most common device of these quick cooking means are the microwave or infrared ovens. Because of the nature of the electromagnetic radiation which energizes such ovens it is possible to simultaneously heat such items or food products within the oven within an extremely short period of time. However, some food products absorb microwave energy to a high degree while others are merely transparent to the microwave energy. In addition, many food products, such as meat and the like, are necessarily heated to a higher degree of temperature while other food products, such as desserts, should not be heated at all.

As a result, numerous techniques and devices have been attempted to provide a means of cooking a single meal simultaneously by heating the various food products or cooking the products to varying degrees without imparting the maximum temperature to all of the food products exposed to the microwave energy.

Such attempts include means of laminating or covering various cross-sectional areas of the food containers to varying degrees to limit the amount of energy transferred to the individual food products. Unfortunatley, many of these include expensive processing means for the packaging, thereby rendering the packaging and food product unnecessarily expensive.

Additional prior art devices include various compartmentized structures configured to retain individual containers. These devices are constructed so that the food products are exposed to different degrees of radiation. Unfortunately, in mass cooking such as in hospitals or other institutions, preparation of many of these prior art structures including individual tray-like support means is time consuming and expensive. Thus, a real need exists for a single integrated package containing the various food products prepared for use in the microwave or infrared ovens.

Another problem commonly associated with such packaging is the internal heating problem which causes the build up of internal pressures within the individual food compartments or packages. Such is not only hazardous in many cases but also deleterious to the cooked product itself.

SUMMARY OF THE INVENTION

The present invention relates to a differential heating container for cooking food contained therein with microwave radiation. More specifically, the differential heating container comprises an upper and lower container element interlocked with each other to cooperatively form a plurality of individual food compartments isolated from one another.

The upper and lower container elements are substantially identical. Each container element comprises a base wall having a side wall extending about the periphery thereof. Extending outwardly from the outer periphery of the side wall is a sealing rim having a pressure relief means formed thereon. The pressure relief means comprises a plurality of grooves formed radially from the inner to outer edge of the sealing rim.

A separator means comprising a plurality of ribs extends inwardly from the side walls to the center of the base wall where they join together to cooperatively form a plurality of individual food pockets. The upper edges of the ribs include locking means to interlock the upper and lower container elements such that corresponding food pockets cooperatively form individual food compartments.

The outer surface of each base wall comprises a microwave radiation opaque material. Equal cross-sectional areas of opposite sides of the base walls are opaque such that the effective heating of the individual food compartments is determined by the ratio of the laminated area to the total area of each individual compartment.

In use, various food products are placed in each of the compartments. The upper and lower elements are then interlocked with the sealing rim sealed together by any suitable sealing process. It should be noted that the container elements may comprise inexpensive material such as various paper products to provide disposal after use.

To heat, the container is placed within a microwave oven and then subjected to radiation, only radiation which is directed through the areas that are transparent to the microwave energy penetrate the container. Thus, the laminating areas in the aligned areas with the reduced amounts of opaqueness are heated the most. Thus, for food that is to be heated to a maximum degree, the areas should be devoid of any opaqueness.

Thus, a single strength radiation source may be effectively used in a given period of time to provide varying amounts of radiation to the food products contained within the container. Consequently, the foods are heated to different temperatures depending upon the degree or variation of opaqueness in the container. As the food is heated, internal pressures are vented to the exterior at a predetermined pressure from the individual compartments through the pressure relief means formed in each of the compartments.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference character refer to similar parts throughout the several views of the drawings.

DETAILED DESCRIPTION OF THE PREFERRED EMBODIMENT

As best shown in FIGS. 1 through 4, the present invention comprises a differential heating container generally indicated as 10 for cooking food contained therein with microwave energy.

Figure 2:
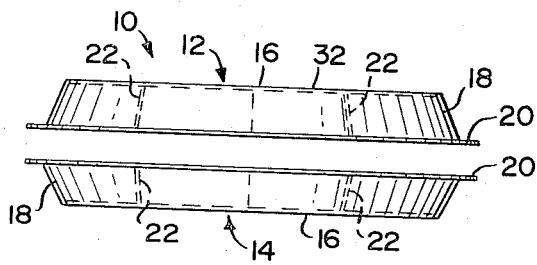
FIG. 2 is an exploded side view of a differential heating container.
Figure 4:
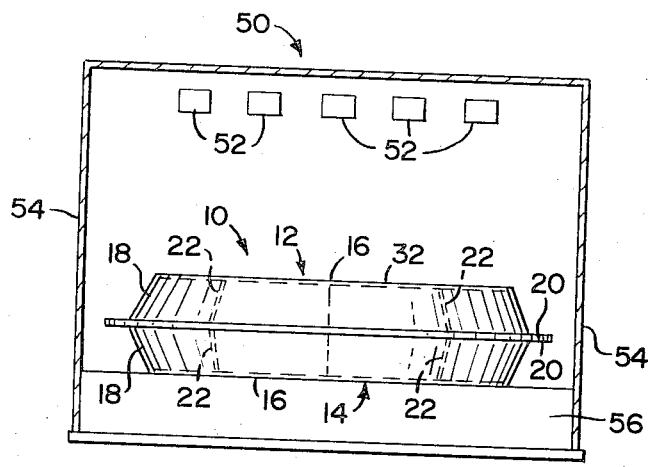
FIG. 4 is a side view of a differential heating container within a microwave oven.

As best shown in FIGS. 2 and 4, differential heating container 10 includes upper or first and lower or second container elements 12 and 14 respectively, which, when sealed together, as more fully described hereinafter, cooperatively form container 10. As constructed, container elements 12 and 14 substantially mirror images of each other. Thus, the description of either container element 12 and 14 applies to both container elements 12 and 14.

Figure 1:
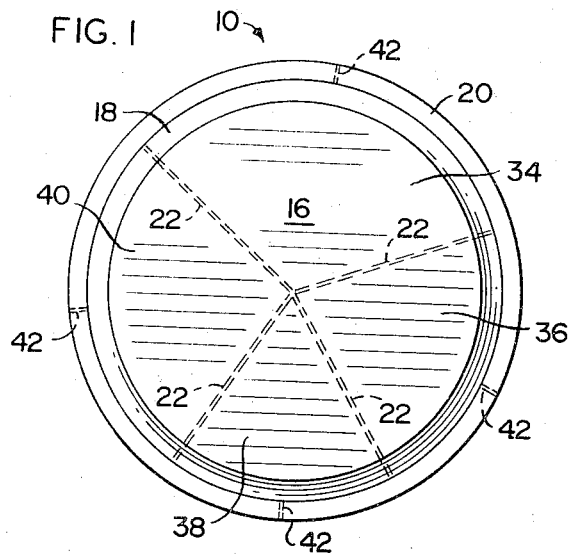
FIG. 1 is a top view of a differential heating container.
Figure 3:
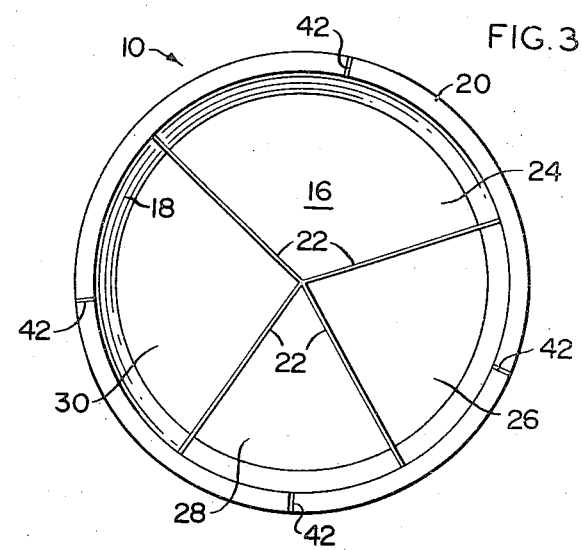
FIG. 3 is a top view of a container element.

Container elements 12 and 14 each comprise circular base wall 16 having annular side wall 18 formed about the periphery thereof. Extending outwardly from the outer periphery of annular side wall 18 is annular sealing rim 20. As shown in FIG. 2, sealing rim 20 is substantially parallel to wall 16. As best shown in FIG. 3, separator means comprising a plurality of ribs 22 extend inwardly from side wall 18 to the center of wall 16 to cooperatively form pockets 24, 26, 28 and 30. Although a circular configuration is shown, other shapes such as rectangle or square are equally suitable.

As best shown in FIG. 2, outer surface 32 of wall 16 comprises opaque areas 34, 36, 38 and 40 corresponding to pockets 24, 26, 28 and 30 respectively. As previously described, walls 16 are substantially identical. Accordingly, areas 24, 26, 28 and 30 are aligned relative to each other while the outer edges of ribs 22 engage each other to cooperatively form enclosed compartments as more fully described hereinafter. Opaque areas 34, 36, 38 and 40 comprise opaque surfaces to microwave energy such that the ratio of the opaque areas 34, 36, 38 and 40 to the area of pockets 24, 26, 28 and 30 respectively determine the relative heating effects within each compartment. Identical opaque areas 34, 36, 38 and 40 are formed on first and second container elements 12 and 14 such that when assembled the corresponding areas of equal opaqueness of first and second container elements 12 and 14 are aligned relative to each other.

As best shown in FIG. 3, differential heating container 10 further includes relief means to vent internal pressures generated during the cooking process. The relief means comprises a plurality of grooves 42 formed on the upper surface of sealing rim 20. Grooves 42 extend radially outward from the inner edge of sealing rim 20 to the outer edge thereof such that the interior of the compartments communicate with atmosphere.

Figure 5:
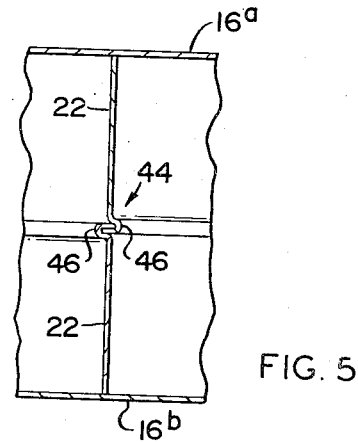
FIG. 5 is a partial detailed cross-sectional view of the ribs of a differential heating container.

As shown in FIG. 5, differential heating container 10 also includes interlocking means generally indicated as 44 to isolate the compartments from each other when elements 12 and 14 are assembled. Interlocking means comprises a substantially U-shaped element 46 formed on the outer edges of ribs 22. U-shaped elements 46 are configured to interlock to seal the compartments from each other.

In use, various foods are placed in each of the pockets 24, 26, 28 and 30 of lower element 14. UPper element 12 is then placed on top of lower element 14 and rotated relative thereto until elements 46 interlock. Sealing rims 20 are then sealed together by any suitable sealing process.

To heat, differential heating container 10 is placed in a microwave oven 50 as shown in FIG. 4. Microwave oven includes microwave radiating elements 52 within walls 54. Container 10 is ordinarily placed upon a nonconductive tray or support 56. Microwave energy is then radiated from element 52 subjecting container 10 to radiation. The radiation only penetrates those areas that are transparent to the microwave energy. Thus, the opaque areas 34, 36, 38 and 48 in the aligned areas are heated with reduced amounts of energy. Thus, food which is to be heated to a maximum degree is placed in areas devoid of any opaqueness, such as meat, in the compartment corresponding to pockets 24.

Food which should be heated to a lesser temperature, such as vegetables and the like are placed in pockets 26 and 30 corresponding to opaque areas 36 and 40 respectively.

As the food is heated within container 10, the internal pressures are vented to the exterior at a predetermined pressure from the individual compartments through the pressure relief means 42 as previously described.

Thus, a single oven may be used for a fixed period of time to heat foods contained within the container 10 to different temperatures depending upon the degree or variation in the container transparency or opaqueness to the microwave radiation.

Thus, an integral single unit container 10 comprising a plurality of compartments associated with various cross-sectional areas of opaqueness 34, 36, 38 and 40 provide a new and useful differential heating container.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described,

What is claimed is:

1. A differential heating container for cooking food contained therein with microwave radiation, said differential heating container comprising an upper and lower container element, each of said container elements comprising a base wall having a side wall formed about the periphery thereof, a sealing rim formed about the outer periphery of each of said side walls, separator means extending between at least two points on the inner periphery of each of said side walls to form at least two pockets between said separator means and said side walls, the outer surface of each of said base walls provided with a material opaque to microwave radiation, said opaque areas formed on opposite corresponding portions of each said base walls of said upper and said lower elements, locking means formed on said separator means to interlock said upper and said lower elements such that corresponding pockets cooperatively form individual compartments isolated from each other, said locking means comprising an element extending substantially perpendicular from said separator means.

2. The differential heating container of claim 1 wherein said separator means comprises a rib extending outward from the interior surface of said base wall of each of said upper and said lower elements and interconnecting at least two points on the interior of said side walls of said upper and said lower elements respectively.

3. The differential heating container of claim 1 wherein said locking means comprises a substantially U-shaped member on the outer edge of said separator means of said upper and said lower elements to cooperatively interlock said upper and said lower elements, said upper and said lower elements interlocked by rotational movement therebetween, said U-shaped members disposed relative to said separator means to interlock said upper and said lower elements against separation due to vertical expansion.

4. The differential heating container of claim 1 wherein said opposite corresponding portions of said opaque area passing substantially equal amounts of radiation through said opposite corresponding portions of said opaque areas of said upper and lower elements.

5. The differential heating container of claim 1 wherein said opaque areas comprise opaque portions formed on said base walls of said upper and said lower container elements such that the heating effect of said microwave radiation is determined by the ratio of said opaque areas of each said compartment relative to the total area of each said corresponding compartments.

6. The differential heating container of claim 1 wherein said sealing rim includes pressure relief means to vent said compartments to the atmosphere.

7. The differential heating container of claim 6 wherein said pressure relief means comprises at least one groove formed in said sealing rim, said groove extending axially from the inner to outer edge of said sealing rim.

8. The differential heating container of claim 1 wherein said laminated areas comprise opaque portions formed on said base walls of said upper and said lower container elements such that the heating effect of said microwave radiation is determined by the ratio of said laminated areas of each said compartment relative to the total area of each said corresponding compartments.

* * * * *